(12) United States Patent
Tokunaga et al.

(10) Patent No.: US 11,370,502 B2
(45) Date of Patent: Jun. 28, 2022

(54) TIRE FORCE ESTIMATING DEVICE AND TIRE FORCE ESTIMATING METHOD

(71) Applicant: KAWASAKI MOTORS, LTD., Akashi (JP)

(72) Inventors: Hisato Tokunaga, Nishinomiya (JP); Kazuhiro Ichikawa, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 63 days.

(21) Appl. No.: 16/343,225

(22) PCT Filed: Oct. 19, 2016

(86) PCT No.: PCT/JP2016/080960
§ 371 (c)(1),
(2) Date: Apr. 18, 2019

(87) PCT Pub. No.: WO2018/073912
PCT Pub. Date: Apr. 26, 2018

(65) Prior Publication Data
US 2019/0242767 A1    Aug. 8, 2019

(51) Int. Cl.
*B62J 45/415*    (2020.01)
*G01L 5/16*    (2020.01)
*B62J 45/412*    (2020.01)

(52) U.S. Cl.
CPC ............. *B62J 45/4151* (2020.02); *G01L 5/16* (2013.01); *B62J 45/412* (2020.02); *B62J 45/415* (2020.02)

(58) Field of Classification Search
CPC ....................................................... G01L 5/16
See application file for complete search history.

(56) References Cited

U.S. PATENT DOCUMENTS

| | | | |
|---|---|---|---|
| 6,904,351 | B1 | 6/2005 | Hac |
| 2009/0276113 | A1 | 11/2009 | Sugimoto |
| 2013/0245900 | A1 | 9/2013 | Fukushima et al. |
| 2015/0105938 | A1* | 4/2015 | Seki ................ B60W 30/18172 701/1 |
| 2015/0127240 | A1 | 5/2015 | Nozawa |
| 2016/0061132 | A1* | 3/2016 | Hieda ................ B60K 31/0083 701/110 |
| 2016/0161526 | A1 | 6/2016 | Miki |
| 2017/0089699 | A1* | 3/2017 | Azuma ................... G01P 15/02 |

FOREIGN PATENT DOCUMENTS

| | | | |
|---|---|---|---|
| DE | 102006002399 | A1 | 10/2006 |
| JP | WO2012067234 | A1 | 5/2014 |
| JP | 201585905 | A | 5/2015 |
| WO | 2015159476 | A1 | 10/2015 |
| WO | WO-2017025042 | A1 * | 2/2017 ............ B60T 8/3205 |

* cited by examiner

Primary Examiner — Matthew G Marini
(74) Attorney, Agent, or Firm — Alleman Hall Creasman & Tuttle LLP

(57) ABSTRACT

A tire force estimating device estimates tire forces which are forces applied from a ground surface to a wheel of a vehicle which turns in a bank state in which a vehicle body is tilted around a forward-rearward axis. The tire force estimating device includes a first tire force estimating section which estimates the force applied from the ground surface to the wheel, based on a change over time of a motion state of the vehicle body within a plane perpendicular to the forward-rearward axis.

11 Claims, 4 Drawing Sheets

TIRE FORCE ESTIMATING DEVICE AND TIRE FORCE ESTIMATING METHOD

TECHNICAL FIELD

The present invention relates to a device and method for estimating tire forces of a vehicle which turns in a bank state in which a vehicle body is tilted (inclined) around a forward-rearward axis.

BACKGROUND ART

Patent Literature 1 discloses a device which estimates wheel forces working between a wheel of a motorcycle and a ground surface, namely, tire forces. This device is configured to estimate the wheel forces so that a total force (Fh) of a centrifugal force and a gravitational force working at the motorcycle is balanced with a total force (Ff4) of a front wheel lateral force and a front wheel vertical force which are applied from the ground surface to a front wheel and a total force (Fr4) of a rear wheel lateral force and a rear wheel vertical force which are applied from the ground surface to a rear wheel.

CITATION LIST

Patent Literature

Patent Literature 1: Japanese Laid-Open Patent Application Publication No. 2015-85905

SUMMARY OF INVENTION

Technical Problem

However, in a transit state in which a tilt (inclination) angle of a vehicle body around the forward-rearward axis, namely, a bank angle, changes over time, for example, at the beginning or end of turning, the above-described balance cannot be kept. Therefore, in such a transit state, the above-described device is unable to accurately estimate the tire forces.

In view of the circumstances, an object of the present invention is to improve accuracy of estimating tire forces in a vehicle which turns in a bank state.

Solution to Problem

According to an aspect of the present invention, there is provided a tire force estimating device which estimates tire forces which are forces applied from a ground surface to a wheel of a vehicle which turns in a bank state in which a vehicle body is tilted around a forward-rearward axis, the tire force estimating device comprising: a first tire force estimating section which estimates the forces applied from the ground surface to the wheel, based on a change over time of a motion state of the vehicle body within a plane perpendicular to the forward-rearward axis.

In accordance with this configuration, since a product of the mass of a mass point and a change over time of a motion state of the mass point is balanced with forces acting on the mass point, the tire forces applied from the ground surface to the wheel are estimated based on the change over time of the motion state of the vehicle body within the plane perpendicular to the forward-rearward axis. Since the tire forces are estimated based on the change over time of the motion state, the tire forces can be estimated with accuracy, even in a transit state in which the bank angle changes over time while the vehicle is turning.

The first tire force estimating section may estimate a vertical force and a lateral force which are applied from the ground surface to the wheel by use of a first motion equation, a second motion equation, and a third motion equation. The first motion equation may indicate a relation of a balance between a change over time of a motion state of the vehicle body in a vertical direction, and the vertical force. The second motion equation may indicate a relation of a balance between a change over time of a motion state of the vehicle body in a lateral direction, and the lateral force. The third motion equation may indicate a relation of a balance between a change over time of a motion state of the vehicle body around the forward-rearward axis, and the vertical force and the lateral force.

The first tire force estimating section may obtain the change over time of the motion state of the vehicle body in the vertical direction, the change over time of the motion state of the vehicle body in the lateral direction, and the change over time of the motion state of the vehicle body around the forward-rearward axis, based on a value associated with a change over time of a bank angle of the vehicle body.

The vehicle may include a front wheel and a rear wheel as the wheel. The first tire force estimating section may estimate a sum of the force applied from the ground surface to the front wheel and the force applied from the ground surface to the rear wheel, based on the change over time of the motion state of the vehicle body within the plane perpendicular to the forward-rearward axis, and may estimate a front wheel force applied from the ground surface to the front wheel and a rear wheel force applied from the ground surface to the rear wheel by dividing the sum of the forces into the front wheel force and the rear wheel force.

The first tire force estimating section may divide the sum of the forces into the front wheel force and the rear wheel force, based on a change over time of a motion state of the vehicle body in a forward and rearward direction.

The first tire force estimating section may change a ratio of dividing the sum of the forces into the front wheel force and the rear wheel force, based on a bank angle.

The tire force estimating device may further comprise a second tire force estimating section which estimates forward-rearward forces applied from the ground surface to the wheel in a forward and rearward direction. The second tire force estimating section may estimate a sum of the forward-rearward force applied from the ground surface to a front wheel and the forward-rearward force applied from the ground surface to a rear wheel, based on a change over time of a motion state of the vehicle body in the forward and rearward direction. The second tire force estimating section may estimate a front wheel forward-rearward force applied from the ground surface to the front wheel, based on a braking force of the front wheel. The second tire force estimating section may estimate a rear wheel forward-rearward force applied from the ground surface to the rear wheel based on the estimated sum of the forward-rearward forces, and the estimated front wheel forward-rearward force.

According to another aspect of the present invention, there is provided a tire force estimating device which estimates tire forces which are forces applied from a ground surface to a wheel of a vehicle which turns in a bank state in which a vehicle body is tilted around a forward-rearward axis, the vehicle including a front wheel and a rear wheel as the wheel, the tire force estimating device comprising: a first tire force estimating section which estimates a front wheel force applied from the ground surface to the front wheel and a rear wheel force applied from the ground surface to the rear wheel, wherein the first tire force estimating section estimates a sum of forces applied from the ground surface to a virtual wheel, and wherein the first tire force estimating section estimates the front wheel force and the rear wheel force by dividing the sum of the forces into the front wheel force and the rear wheel force based on a change over time of a motion state of the vehicle body in a forward and rearward direction, and a bank angle.

According to aspect of the present invention, there is provided a method of estimating tire forces which are forces applied from a ground surface to a wheel of a vehicle which turns in a bank state in which a vehicle body is tilted around a forward-rearward axis, the method comprising: estimating a vertical force applied in a vertical direction from the ground surface to the wheel and a lateral force applied in a lateral direction from the ground surface to the wheel, based on an angle, an angular velocity and an angular acceleration rate of the vehicle body around the forward-rearward axis.

According to another aspect of the present invention, there is provided a method of estimating tire forces which are forces applied from a ground surface to a wheel of a vehicle which turns in a bank state in which a vehicle body is tilted around a forward-rearward axis, the vehicle including a front wheel and a rear wheel as the wheel, the method comprising: estimating a sum of the forces applied from the ground surface to a virtual wheel; and dividing the sum of the forces into a front wheel force applied to the front wheel and a rear wheel force applied to the rear wheel, based on a change over time of a motion state of the vehicle body in a forward and rearward direction, and a bank angle.

Advantageous Effects of Invention

In accordance with the present invention, accuracy of estimating tire forces in a vehicle which turns in a bank state can be improved.

DESCRIPTION OF EMBODIMENTS

Hereinafter, the embodiment of the present invention will be described with reference to the accompanying drawings. In the description, dotted symbols of Newton's notation are expressed at the right of alphabets representing variables, in some cases. Except otherwise noted, the term "wheel" refers to an assembly comprised of a wheel in a narrow sense, including a hub, a rim, and a spoke, and a tire mounted on the rim and configured to contact a ground surface. The term "forward-rearward axis" is a virtual axis line. The forward-rearward axis is defined as an axis line extending in a forward and rearward direction, passing through a ground point of a front wheel (point at which the front wheel is grounded on the ground surface) and a ground point of a rear wheel (point at which the rear wheel is grounded on the ground surface) and being perpendicular (orthogonal) to a vehicle width direction. A "bank angle" is defined as a tilt (inclination) angle of the vehicle body around the forward-rearward axis. In other words, the "bank angle" is defined as tilt (inclination) [deg] of an extension direction of a center line of the vehicle body in the vehicle width direction in a front view, with respect to a direction perpendicular to the ground surface. In a case where the center line of the vehicle body in the vehicle width direction extends in the direction perpendicular to the ground surface, the vehicle body is in an upright state and the bank angle is a zero value [deg].

Figure 1:
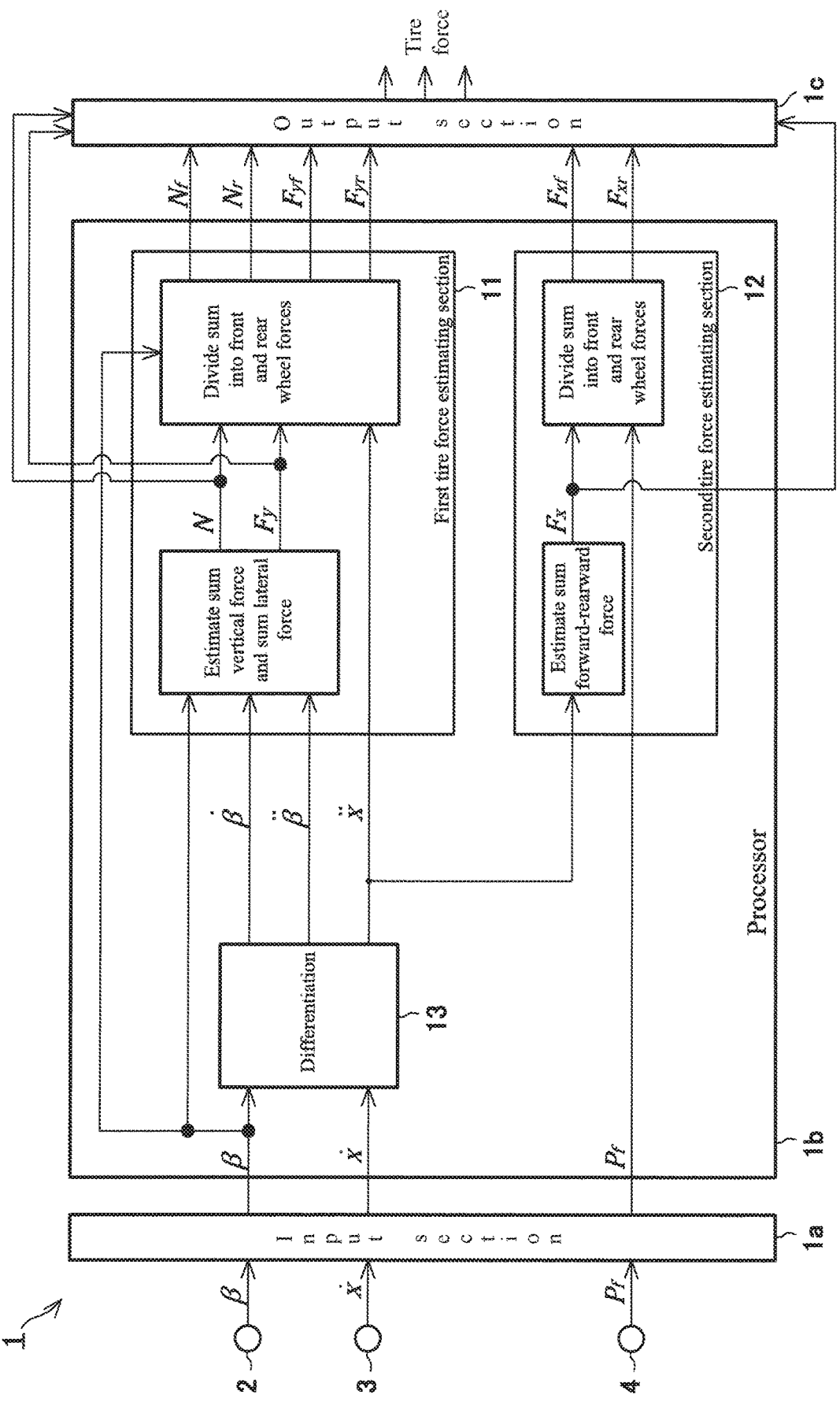
FIG. 1 is a block diagram showing the configuration of a tire force estimating device according to an embodiment.

A tire force estimating device 1 of FIG. 1 is mounted in a vehicle in the present example. The tire force estimating device 1 is configured to estimate "tire forces" which are forces applied from the ground surface to the wheel of the vehicle which turns in the bank state in which the vehicle body is tilted around the forward-rearward axis. In a case where the vehicle travels straight ahead, the vehicle travels in the upright state in which a vehicle height direction substantially conforms to the direction (substantially vertical direction) perpendicular to the ground surface.

(Motorcycle)

As an example of this vehicle, there is a motorcycle. The motorcycle includes one front wheel and one rear wheel as the wheels. In the motorcycle, at least one of the wheels is a drive wheel. In the present example, the rear wheel is the drive wheel, and the front wheel is a driven wheel and a steered wheel. Torque generated by a driving power source such as an engine or an electric motor is transmitted to the drive wheel. A braking force which utilizes inertia of the driving power source, such as an engine braking force or a regenerative braking force, is applied to the drive wheel. The motorcycle includes a front wheel brake device which brakes the front wheel, and a rear wheel brake device which brakes the rear wheel. These brake devices are hydraulically powered. Each of the brake devices is configured to apply the braking force which is substantially proportional to a brake pressure, to the corresponding wheel.

(Tire Force)

It is assumed that the slope and cant of the ground surface are not considered. The tire force estimating device 1 is able to estimate as the tire forces, "vertical force N" applied from the ground surface to the wheel in a vertically upward direction, "lateral force $F_y$" applied from the ground surface to the wheel in a lateral direction, and "forward-rearward force $F_x$" applied from the ground surface to the wheel in a forward and rearward direction. The vertical direction, the forward and rearward direction, and the lateral direction are orthogonal to each other. The forward and rearward direction is defined as a direction extending along the above-described forward-rearward axis. The lateral direction is defined as a direction in which an axle extends in a state in which the vehicle travels straight ahead. The forward and rearward direction and the lateral direction change according to a change of a direction of the vehicle body around a vertical axis.

The tire force estimating device 1 is able to estimate as the tire forces, "front wheel force" applied from the ground surface to the front wheel, and "rear wheel force" applied from the ground surface to the rear wheel.

The tire force estimating device 1 is able to estimate as the tire forces, "front wheel vertical force $N_f$" applied from the ground surface to the front wheel in the vertically upward direction, and "rear wheel vertical force $N_r$" applied from the ground surface to the rear wheel in the vertically upward direction. The tire force estimating device 1 is able to estimate as the tire forces, "front wheel lateral force $F_{yf}$" applied from the ground surface to the front wheel in the lateral direction, and "rear wheel lateral force $F_{yr}$" applied from the ground surface to the rear wheel in the lateral direction. The tire force estimating device 1 is able to estimate as the tire forces, "front wheel forward-rearward force $F_{xf}$" applied from the ground surface to the front wheel in the forward and rearward direction, and "rear wheel forward-rearward force $F_{xr}$" applied from the ground surface to the rear wheel in the forward and rearward direction.

Hereinafter, a sum of the "front wheel vertical force $N_f$" and the "rear wheel vertical force $N_r$" will be sometimes referred to as "sum vertical force N". A sum of the "front wheel lateral force $F_{yf}$" and the "rear wheel lateral force $F_{yr}$" will be sometimes referred to as "sum lateral force $F_y$". A sum of the "front wheel forward-rearward force $F_{xf}$" and the "rear wheel forward-rearward force $F_{xr}$" will be sometimes referred to as "sum forward-rearward force $F_x$". The above-described "vertical force" means the "front wheel vertical force $N_f$", the "rear wheel vertical force $N_r$" and the "sum vertical force N". The same applies to the above-described "lateral force" and "forward-rearward force".

The above-described "front wheel force" means the "front wheel vertical force $N_f$", the "front wheel lateral force $F_{yf}$" and the "front wheel forward-rearward force $F_{xf}$". Further, the "front wheel force" means a total force of two or more forces of the three forces (e.g., total force of the front wheel vertical force $N_f$ and the front wheel lateral force $F_{yf}$). The "rear wheel force" means the "rear wheel vertical force $N_r$", the "rear wheel lateral force $F_{yr}$" and the "rear wheel forward-rearward force $F_{xr}$". Further, the "rear wheel force" means a total force of two or more forces of the three forces (e.g., total force of the rear wheel vertical force $N_r$ and the rear wheel lateral force $F_{yr}$).

(Tire Force Estimating Device)

The tire force estimating device 1 is realized by a controller including a storage section which contains therein estimation programs relating to a procedure of a method of estimating the tire forces, an input section 1a which receives input values indicating a vehicle state such as the bank angle of the vehicle body (tilt angle of the vehicle body around the forward-rearward axis) and an acceleration rate in the forward and rearward direction, a processor 1b which executes estimation of the tire forces with reference to the input values provided to the input section 1a and the programs stored in the storage section, and an output section 1c which outputs a result (tire forces) of calculation obtained by the processor 1b to outside. Note that the storage section may temporarily store the input values and intermediate values obtained during execution of the programs based on the input values. As an example of the controller, there is an in-vehicle ECU (electric control unit). The storage section may be configured to pre-store information such as an estimated mass which is an estimated value of a vehicle mass which is a sum of the mass of the vehicle, the mass of person(s) riding in the vehicle, and the mass of loaded belongings, a distance from the center of mass (center of gravity) of the vehicle body to the ground surface, geometric information of the vehicle body such as a wheel base. Alternatively, these information may be provided to the input section 1a from outside of the tire force estimating device 1, or may be obtained as the intermediate values by the processor 1b during execution of the estimation programs.

The tire force estimating device 1 includes a first tire force estimating section 11, a second tire force estimating section 12, and a differentiating section 13, as functional blocks of the processor 1b.

In the present embodiment, the tire force estimating device 1 receives as the input values, a bank angle β, a vehicle speed (forward-rearward speed of the vehicle body) x•, and a front wheel brake pressure $P_f$ in a hydraulic front wheel brake device. In addition to the tire force estimating device 1, the vehicle includes a bank angle sensor 2 which detects the bank angle β, a vehicle speed sensor 3 which detects a vehicle speed, and a front wheel brake pressure sensor 4 which detects the front wheel brake pressure $P_f$. The bank angle sensor 2 is configured to output the bank angle β of the vehicle body in succession over time so that a change over time of the bank angle β can be known. The vehicle speed sensor 3 is configured to output the vehicle speed in succession over time so that a change over time of the vehicle speed can be known. The differentiating section 13 is configured to derive a bank angular velocity (first-order temporal differentiation value of the bank angle β) β • which is a change over time of the bank angle β, and a bank angular acceleration rate (second-order temporal differentiation value of the bank angle β) β•• which is a change over time of the bank angular velocity β •. The differentiating section 13 is configured to derive a forward-rearward acceleration rate (first-order temporal differentiation value of the vehicle speed x•) x•• which is a change over time of the vehicle speed x•, based on the input vehicle speed x•.

This is exemplary. The vehicle may include a bank angular velocity sensor which detects the bank angular velocity β •, and the tire force estimating device 1 may include an integrating section which derives the bank angle β based on the bank angular velocity β provided by the bank angular velocity sensor. The vehicle may include an acceleration rate sensor which detects the forward-rearward acceleration rate x ••, and the tire force estimating device 1 may receive the forward-rearward acceleration rate x •• from the acceleration rate sensor. In a case where it can be determined that the vehicle is traveling straight ahead, the bank angle and the bank angular acceleration rate can be derived by use of the bank angular velocity sensor, by determining that the bank angle in the straight-ahead traveling state is zero.

(Forward-Rearward Force Fx, Second Tire Force Estimating Section)

Figure 2:
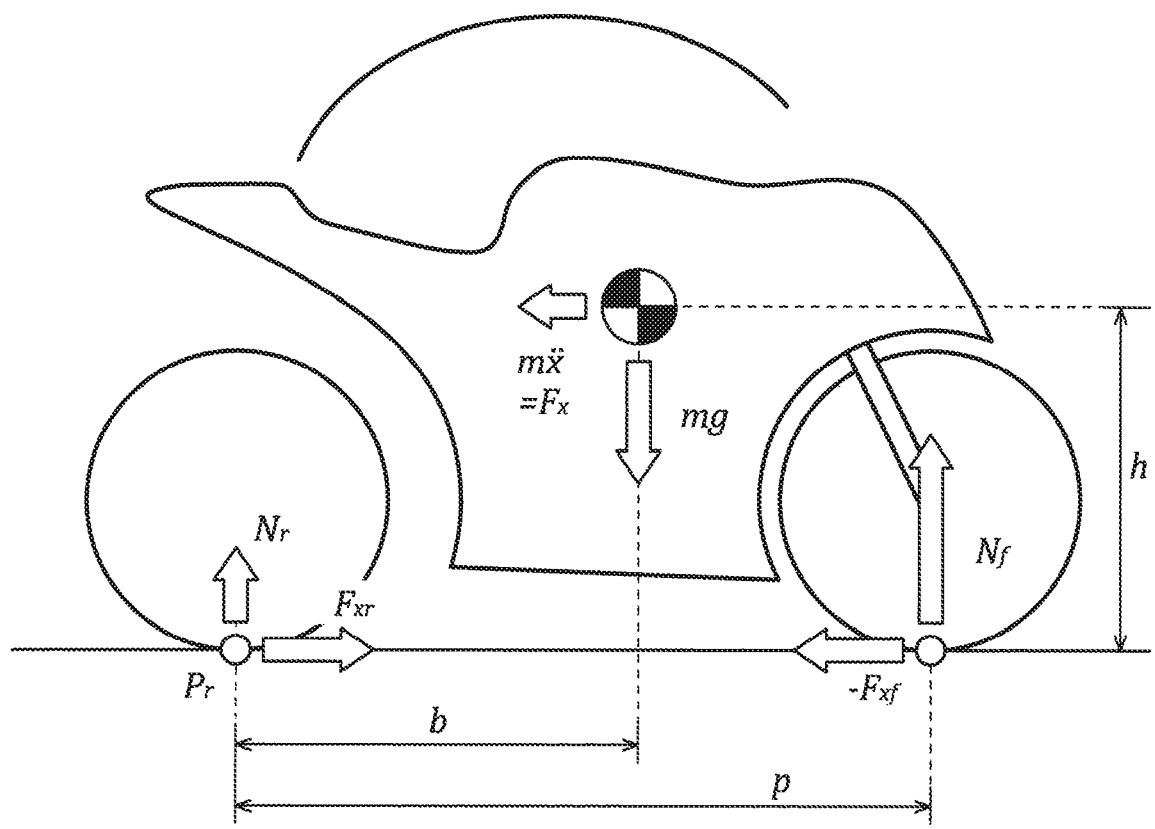
FIG. 2 is a conceptual view showing estimation of forward-rearward forces.

For easier understanding of the description, the second tire force estimating section 12 will be firstly described. As shown in FIGS. 1 and 2, the second tire force estimating section 12 is configured to estimate the forward-rearward forces applied from the ground surface to the wheel in the forward and rearward direction. The "forward-rearward forces" estimated by the second tire force estimating section 12 include the sum forward-rearward force $F_x$, the front wheel forward-rearward force $F_{xf}$ and the rear wheel forward-rearward force $F_{xr}$. The second tire force estimating section 12 estimates the sum forward-rearward force $F_x$ according to an equation (1).

[Equation 1]

$$F_x = \ddot{x} \quad (1)$$

m is a vehicle mass. As indicated by the equation (1), in the present example, a change over time of a momentum of the vehicle body in the forward and rearward direction is equal to the sum forward-rearward force $F_x$. The vehicle mass m may be handled as a constant and may be pre-stored in the storage section of the tire force estimating device 1. In that case, the second tire force estimating section 12 estimates the sum forward-rearward force $F_x$ based on a change over time of a motion state of the vehicle body in the forward and rearward direction, namely, the forward-rearward acceleration rate x •• of the vehicle body.

The second tire force estimating section 12 estimates the front wheel forward-rearward force $F_{xf}$ and the rear wheel forward-rearward force $F_{xr}$, by dividing the estimated sum forward-rearward force $F_x$ into the front wheel forward-rearward force $F_{xf}$ and the rear wheel forward-rearward force $F_{xr}$. The second tire force estimating section 12 estimates the front wheel forward-rearward force $F_{xf}$ according to an equation (2), on assumption that the front wheel forward-rearward force $F_{xf}$ is equivalent to the front wheel braking force and the front wheel braking force is proportional to the front wheel brake pressure Pr.

[Equation 2]

$$F_{xf} = KP_f \quad (2)$$

K is a proportional constant. The numeric value of the proportional constant can be derived in advance (at the stage of designing the tire force estimating device 1) and pre-stored in the storage section of the tire force estimating device 1. As described above, the second tire force estimating section 12 estimates the front wheel forward-rearward force $F_{xf}$, based on the front wheel brake pressure $P_f$, input to the tire force estimating device 1.

Then, the second tire force estimating section 12 estimates the rear wheel forward-rearward force $F_{xr}$ according to an equation (3), on assumption that the sum forward-rearward force $F_x$ is a sum of the front wheel forward-rearward force $F_{xf}$ and the rear wheel forward-rearward force $F_{xr}$.

[Equation 3]

$$F_{xr} = F_x - F_{xf} \quad (3)$$

In this way, the second tire force estimating section 12 estimates the rear wheel forward-rearward force $F_{xr}$ by subtracting the front wheel forward-rearward force $F_{xf}$ from the sum forward-rearward force $F_x$. The front wheel forward-rearward force $F_{xf}$ is regarded as the front wheel braking force. In contrast, the rear wheel forward-rearward force $F_{xr}$ is a composition of driving power transmitted from the driving power source to move the vehicle body in a forward direction, a braking force based on the inertia of the driving power source, a rear wheel braking force generated by the rear wheel brake device, and the like.

In the tire force estimating device 1 of the present example, the forward-rearward acceleration rate x •• and the front wheel brake pressure $P_f$ are monitored, and thus the three forces which are the sum forward-rearward force $F_x$, the front wheel forward-rearward force $F_{xf}$, and the rear wheel forward-rearward force $F_{xr}$ can be estimated. After the sum forward-rearward force $F_x$ and the front wheel forward-rearward force $F_{xf}$ are derived, the rear wheel forward-rearward force $F_{xr}$ is estimated passively. This makes it possible to easily obtain the estimated values of the three forces.

(Vertical Force N, Lateral Force $F_y$, First Tire Force Estimating Section)

Figure 3:
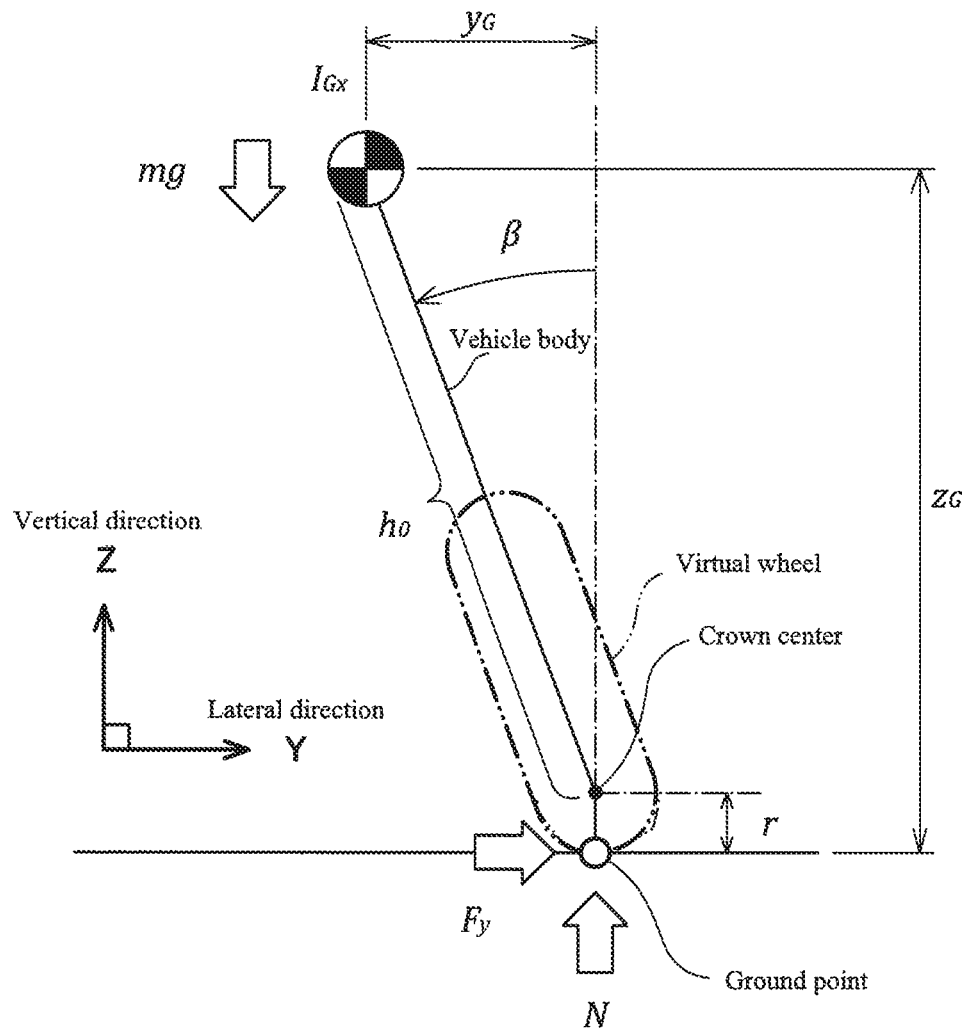
FIG. 3 is a conceptual view showing estimation of a vertical force and a lateral force.

Next, the first tire force estimating section 11 will be described. As shown in FIGS. 1 and 3, the first tire force estimating section 11 is configured to estimate the forces applied from the ground surface to the wheel, based on a change over time of a motion state of the vehicle body within a plane perpendicular to the forward-rearward axis of the vehicle body. The "forward-rearward" axis is defined as a virtual axis line extending in the forward and rearward direction and passing through the front wheel ground point and the rear wheel ground point. The "motion state" means a motion state of a translational motion and a motion state of a rotational motion. In addition, the "motion state" means a "momentum" which is equivalent to a product of an inertia mass and a speed. The "change over time of the motion state" is equivalent to a product of the inertia mass and the acceleration rate in a motion direction in the case of the translational motion, and to a product of an inertia moment and an angular acceleration rate in the motion direction in the case of the rotational motion. The term "based on a change over time of a motion state" is equivalent to "based on the acceleration rate in the motion direction" in the case of the translational motion" and to "based on the angular acceleration rate in the motion direction" in the case of the rotational motion. Therefore, it may be said that the first tire force estimating section 11 estimates the forces applied from the ground surface to the wheel based on the acceleration rate and/or the angular acceleration rate of the vehicle body within the plane perpendicular to the forward-rearward axis of the vehicle body.

The "motion state of the vehicle body within the plane perpendicular to the forward-rearward axis" includes the motion state in the vertical direction, the motion state in the lateral direction, and the motion state around the forward-rearward axis (see equations (4) to (6)). In the vehicle traveling without skidding while keeping a state in which the wheels are grounded on the ground surface without vertical unevenness, the motion of the center of mass (center of gravity) of the vehicle body in the vertical direction or in the lateral direction (in other words, movement of the center of mass of the vehicle body in the vertical direction or in the lateral direction) occurs due to a change over time of the bank angle (tilt (inclination) angle of the vehicle body around the forward-rearward axis). The rotational motion around the forward-rearward axis is exactly the change over time of the bank angle. As described above, the vehicle of the present example turns while being tilted (inclined) around the forward-rearward axis. Typically, the change over time of the turning occurs at the beginning and end of the turning.

The first tire force estimating section 11 estimates the tire forces by taking into account, the change over time of the motion state of the vehicle body which occurs due to the change in the bank angle (external force applied to the wheel and hence to the vehicle body due to the change over time of the bank angle). For this reason, accuracy of estimating the tire forces is high, during transit traveling (e.g., at the beginning and end of the turning) in which the bank angle changes over time.

The forces estimated by the first tire force estimating section 11 include the sum vertical force N, the sum lateral force $F_y$, the front wheel vertical force $N_f$, the front wheel lateral force $F_{yf}$, the rear wheel vertical force $N_r$, and the rear wheel lateral force $F_{yr}$. In the present example, the first tire force estimating section 11 estimates both of the vertical forces N, $N_f$, $N_r$ and the lateral forces $F_y$, $F_{yf}$, $F_{yr}$. Alternatively, the first tire force estimating section 11 may estimate at least one of the vertical forces N, $N_f$, $N_r$ and the lateral forces $F_y$, $F_{yf}$, $F_{yr}$.

FIG. 3 is a view showing a principle of tire force estimation performed by the first tire force estimating section 11. As shown in FIG. 3, in the estimation performed by the first tire force estimating section 11, a model in which the vehicle body is expressed as a simple rigid body and a mass point within a plane (YZ plane) perpendicular to the forward-rearward axis is assumed. In general, the vehicle includes the plurality of wheels which are distant from each other in the forward and rearward direction. However, in the model shown in FIG. 3, a dimension in the forward and rearward direction is omitted. Accordingly, in this model, a "virtual wheel" which is a representative or integration of the plurality of wheels within the vehicle is assumed. In the present example, it is assumed that the tire force estimating device 1 is mounted in a motorcycle including one front wheel and one rear wheel. The virtual wheel is one wheel. Note that the position of the mass point is used as the position of the center of mass of the vehicle body.

The first tire force estimating section 11 estimates the vertical force and the lateral force which are applied to the virtual wheel by use of a first equation of motion (motion equation (4) shown below), a second equation of motion (motion equation (5) shown below), and a third equation of motion (motion equation (6) shown below) which are expressed based on the model. The vertical force applied to the virtual wheel corresponds to the sum vertical force N. The lateral force applied to the virtual wheel corresponds to the sum lateral force $F_y$.

[Equation 4]

$$m\ddot{z}_G = N - mg \qquad (4)$$

[Equation 5]

$$m\ddot{y}_G = F_y \qquad (5)$$

[Equation 6]

$$I_{Gx}\ddot{\beta} = -Ny_G + F_y z_G \qquad (6)$$

N is a vertical load applied from the ground surface to the vehicle, and corresponds to the "sum vertical force". g is a gravitational acceleration rate. $I_{Gx}$ is an inertia moment (roll inertia moment) of the vehicle body around the forward-rearward axis. $\beta$ is the bank angle. $y_G$ is a lateral position of the center of mass of the vehicle (y-coordinate of the position of the center of mass of the vehicle). $z_G$ is a vertical position of the center of mass of the vehicle (z-coordinate of the position of the center of mass of the vehicle). Note that an origin of the Y-Z plane is set to the ground point of the tire.

The first motion equation (4) is an equation representing a relation of a balance between a change over time of the motion state of the vehicle body in the vertical direction (see left side) and a sum of the external forces applied to the center of mass with respect to the vertical direction (see right side). As the external forces, the vertical force and the gravitational force are considered. In the first motion equation (4), mg is the gravitational force applied to the center of mass of the vehicle body. $z_G$ •• is a second-order temporal differentiation value of the vertical position $z_G$ of the center of mass of the vehicle body, and is a vertical acceleration rate of the center of mass of the vehicle body. As represented by the first motion equation (4), the sum vertical force N changes according to the vertical acceleration rate.

The second motion equation (5) is an equation representing a relation of a balance between a change over time of the motion state of the vehicle body in the lateral direction (see left side) and a sum of the external forces applied to the center of mass with respect to the lateral direction (see right side). As the external forces, the lateral force (sum lateral force $F_y$) is considered. $y_G$ •• is a second-order temporal differentiation value of the lateral position $y_G$ of the center of mass of the vehicle body, and is a lateral acceleration rate of the center of mass of the vehicle body. As represented by the second motion equation (5), the sum vertical force $F_y$ changes according to the lateral acceleration rate.

The third motion equation (6) is an equation representing a relation of a balance between a change over time of the motion state of the vehicle body around the forward-rearward axis (see left side) and a sum of moments of the external forces applied to the center of mass of the vehicle body around the forward-rearward axis (see right side). As the moments of the external forces, a moment based on the vertical force and a moment based on the lateral force are considered. The moment based on the vertical force is a product of the vertical force and a distance in the lateral direction (hereinafter will be referred to as "lateral mass center distance") from the ground point of the tire to the position of the center of mass of the vehicle body. The moment based on the lateral force is a product of the lateral force and a distance in the vertical direction (hereinafter will be referred to as "vertical mass center distance") from the ground point of the tire to the position of the center of mass of the vehicle body. In the present example, a y-z coordinate system in which the ground point of the tire is the origin is considered. The lateral position (y-coordinate) of the center of mass of the vehicle body corresponds to the lateral mass center distance. The vertical position (z-coordinate) of the center of mass of the vehicle body corresponds to the vertical mass center distance.

Now it is assumed that the tire is always grounded, and the vertical position of the ground point of the tire is 0 and fixed. In a case where a crown diameter r of the virtual wheel is taken into account, the vertical position $z_G$ of the center of mass of the vehicle body is represented by an equation (7), and the lateral position $y_G$ of the center of mass of the vehicle body is represented by an equation (8). According to the equation (7), the second-order temporal differentiation value of the vertical position $z_G$ (vertical acceleration rate of the center of mass of the vehicle body) $z_G$ •• is expressed as an equation (9). The tire of a vehicle (e.g., automobile) including right and left wheels has a flat tread surface. In fact, the tire mounted on the vehicle which turns in the bank state has a tread surface having a cross-section with a substantially semicircular shape in a front view so that the vehicle body is tilted (inclined) easily around the forward-rearward axis while the vehicle is turning. The "crown diameter" is a curvature radius of the tread surface of the tire. In the present example, the cross-section of the tread surface has a perfect-circle arc shape, and it is assumed that the tire does not have a tread pattern and a spike.

[Formula 7]

$$z_G = r + h_0 \cos \beta \qquad (7)$$

[Formula 8]

$$y_G = -h_0 \sin \beta \qquad (8)$$

[Formula 9]

$$\ddot{z}_G = -h_0(\ddot{\beta} \sin \beta + \dot{\beta}^2 \cos \beta) \qquad (9)$$

$h_0$ is a distance from a crown center within the plane perpendicular to the forward-rearward axis to the center of mass of the vehicle body. Irrespective of the bank angle $\beta$, a line connecting the crown center to the center of mass of the vehicle body extends in the vehicle height direction.

Therefore, for easier understanding of the description, hereinafter, the distance $h_0$ will be referred to as "height of the center of mass". Since the vehicle body is assumed as the rigid body, the height $h_0$ of the center of mass is constant.

In a certain vehicle in which the tire force estimating device 1 is mounted, the crown diameter of the front wheel and the crown diameter of the rear wheel are different from each other. In that case, as the crown diameter r of the virtual wheel, for example, an average value of the crown diameter of the front wheel and the crown diameter of the rear wheel may be used. Or, the crown diameter of the front wheel or the crown diameter of the rear wheel may be used as the crown diameter r of the virtual wheel.

According to the equations (4) and (9), the sum vertical force N is expressed as an equation (10). According to the equations (5), (6), and (9), the sum lateral force $F_y$ is expressed as an equation (11).

[Equation 10]

$$N = m\{g - h_0(\ddot{\beta}\sin\beta + \dot{\beta}^2\cos\beta)\} \quad (10)$$

[Equation 11]

$$F_y = \frac{(I_{Gx} + mh_0^2\sin^2\beta)\ddot{\beta} - mh_0(g - h_0\dot{\beta}^2\cos\beta)\sin\beta}{r + h_0\cos\beta} \quad (11)$$

Thus, the sum vertical force N and the sum lateral force $F_y$ can be estimated from the vehicle mass m, the height $h_0$ of the center of mass for which the crown diameter r is taken into account, the roll inertia moment $I_{Gx}$, the bank angle $\beta$, and the value associated with the change over time of the bank angle $\beta$. Among these, the vehicle mass m, the crown diameter r, the height $h_0$ of the center of mass, and the roll inertia moment $I_{Gx}$, can be handled as the constants along with the gravitational acceleration rate g, and may be pre-stored in the storage section of the tire force estimating device 1. The "value associated with the change over time of the bank angle $\beta$" includes the temporal differentiation value of bank angle $\beta$, such as the first-order temporal differentiation value (bank angular velocity) and the second-order temporal differentiation value (bank angular acceleration rate).

The first tire force estimating section 11 estimates the sum vertical force N according to the equation (10) and the sum lateral force $F_y$ according to the equation (11), based on the bank angle $\beta$ provided to the tire force estimating device 1, and the bank angular velocity $\dot{\beta}$ and the bank angular acceleration rate $\ddot{\beta}$, which are obtained by the differentiating section 13. Thus, the tire force estimating device 1 of the present example is able to estimate the sum vertical force N and the sum lateral force $F_y$ by merely monitoring the bank angle $\beta$ and the value associated with the change over time of the bank angle $\beta$.

Figure 4:
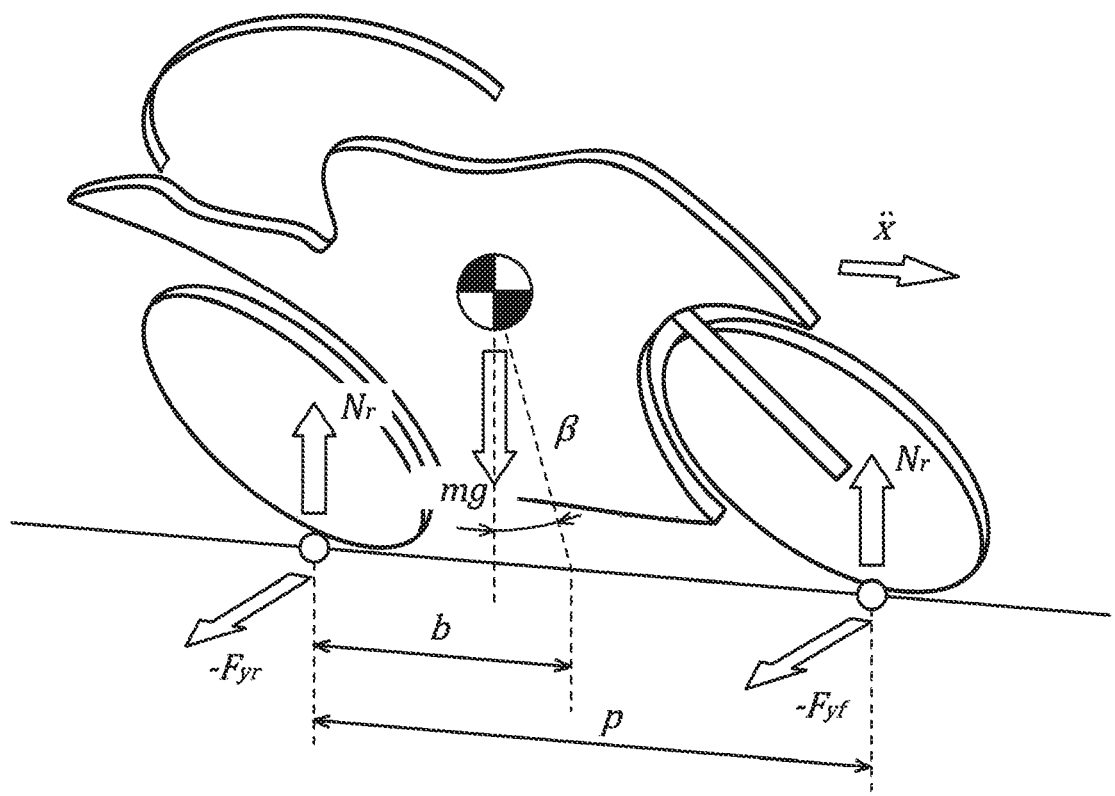
FIG. 4 is a conceptual view showing dividing of the vertical force into a front wheel vertical force and a rear wheel vertical force and dividing of the lateral force into a front wheel lateral force and a rear wheel lateral force.

As shown in FIGS. 1, 4A and 4B, the first tire force estimating section 11 estimates the front wheel force applied from the ground surface to the front wheel and the rear wheel force applied from the ground surface to the rear wheel by dividing the estimated sum force into the front wheel force and the rear wheel force. In the present example, the first tire force estimating section 11 estimates the sum vertical force N and the sum lateral force $F_y$ as the "sum of the forces (sum force)". The first tire force estimating section 11 divides the sum vertical force N into the front wheel vertical force $N_f$ and the rear wheel vertical force $N_r$ and divides the sum lateral force $F_y$ into the front wheel lateral force $F_{yf}$ and the rear wheel lateral force $F_{yr}$. In this way, the first tire force estimating section 11 estimates the front wheel vertical force $N_f$ and the front wheel lateral force $F_{yf}$ as the front wheel force, and estimates the rear wheel vertical force $N_r$ and the rear wheel lateral force $F_{yr}$ as the rear wheel force. Specifically, as represented by an equation (12), the first tire force estimating section 11 divides the sum vertical force N which is a sum of the front wheel vertical force $N_f$ and the rear wheel vertical force $N_r$ into the front wheel vertical force $N_f$ and the rear wheel vertical force $N_r$. As represented by an equation (13), the first tire force estimating section 11 divides the sum lateral force $F_y$ which is a sum of the front wheel lateral force $F_{yf}$ and the rear wheel lateral force $F_{yr}$ into the front wheel lateral force $F_{yf}$ and the rear wheel lateral force $F_{yr}$.

[Equation 12]

$$N = N_f + N_r \quad (12)$$

[Equation 13]

$$F_y = F_{yf} + F_{yr} \quad (13)$$

The first tire force estimating section 11 divides the sum force into the front wheel force and the rear wheel force based on a change over time of the motion state of the vehicle body in the forward and rearward direction. As described above, the change over time of the motion state of the vehicle body in the forward and rearward direction corresponds to the sum forward-rearward force $F_x$. Therefore, it may be said that the first tire force estimating section 11 divides the sum force into the front wheel force and the rear wheel force based on the sum forward-rearward force $F_x$ and the forward-rearward acceleration rate $\ddot{x}$. Further, the first tire force estimating section 11 divides the sum force into the front wheel force and the rear wheel force based on the bank angle state.

In the present example, the first tire force estimating section 11 divides the sum vertical force N based on the change over time of the motion state of the vehicle body in the forward and rearward direction (the sum forward-rearward force $F_x$) and the bank angle. The first tire force estimating section 11 divides the sum lateral force $F_y$ based on the change over time of the motion state of the vehicle body in the forward and rearward direction (the sum forward-rearward force $F_x$) and the bank angle.

Specifically, the first tire force estimating section 11 derives the front wheel vertical force $N_f$ from the sum vertical force N according to an equation (14), and derives the rear wheel vertical force $N_r$ from the sum vertical force N and the front wheel vertical force $N_f$ according to an equation (15) to which the equation (12) has been converted. Also, the first tire force estimating section 11 derives the front wheel lateral force $F_{yf}$ from the sum lateral force $F_y$ according to an equation (16), and derives the rear wheel lateral force $F_{yr}$ from the sum lateral force $F_y$ and the front wheel lateral force $F_{yf}$ according to an equation (17) to which the equation (13) has been converted.

[Equation 14]

$$N_f = \frac{Nb}{p} + G_N(\ddot{x}, \beta) \quad (14)$$

-continued

[Equation 15]

$$N_r = N - N_f \quad (15)$$

[Equation 16]

$$F_{yf} = \frac{F_y b}{p} + G_{F_y}(\ddot{x}, \beta) \quad (16)$$

[Equation 17]

$$F_{yr} = F_y - F_{yf} \quad (17)$$

p is the wheel base (distance in the forward and rearward direction from a rear wheel axle to a front wheel axle). b is a distance in the forward and rearward direction from the rear wheel axle to the center of mass of the vehicle body. Each of $G_N$ (x ••, $\beta$) in the equation (14) and $G_{F_y}$ (x ••, $\beta$) in the formula (16) is derived by a function in which the forward-rearward acceleration rate x •• and the bank angle $\beta$ are variables. $G_N$ (x ••, $\beta$) and $G_{F_y}$ (x ••, $\beta$) are defined by different functions, and take different values depending on the vehicle (and its design parameters).

For example, $G_N$ (x ••, $\beta$) and $G_{F_y}$ (x ••, $\beta$) are defined so that a ratio of the front wheel vertical force $N_f$ with respect to the sum vertical force N is lower and a ratio of the front wheel lateral force $F_{yf}$ with respect to the sum lateral force $F_y$ is lower, as the positive forward-rearward acceleration rate x •• (acceleration rate in the forward traveling direction) is higher, under the condition in which the bank angle $\beta$ is equal. $G_N$ (x ••, $\beta$) and $G_{F_y}$ (x ••, $\beta$) are defined so that the ratio of the front wheel vertical force $N_f$ with respect to the sum vertical force N is higher and the ratio of the front wheel lateral force $F_{yf}$ with respect to the sum lateral force $F_y$ is higher, as the bank angle $\beta$ is larger, under the condition in which the positive forward-rearward acceleration rate x •• is equal. Thus, by varying the dividing ratio between the front wheel force and the rear wheel force based the bank angle $\beta$, the dividing ratio in the bank state can be made close to an actual value. This makes it possible to improve accuracy of estimating the front wheel force and the rear wheel force under a transit state.

(Operation)

As described above, the tire force estimating device 1 includes the first tire force estimating section 11 which estimates the forces applied from the ground surface to the wheel, based on the change over time of the motion state of the vehicle body within the plane perpendicular to the forward-rearward axis of the vehicle body. The change over time of the motion state of the center of mass of the vehicle body within the plane perpendicular to the forward-rearward axis occurs, due to, for example, the change in the bank angle (tilt (inclination) angle of the vehicle body around the forward-rearward axis). According to a second rule of the motion, the change over time of the motion state of the vehicle body correlates with the external forces acting on the vehicle body (the change over time of the vehicle body speed is proportional to the external force, and the change over time of the momentum of the vehicle body is balanced with the external force). As the external forces, the tire forces applied from the ground surface to the wheel are dominant. In light of this, by taking into account, the change over time of the motion state of the vehicle body within the plane perpendicular to the forward-rearward axis, the tire forces can be estimated with high accuracy even under the transit state in which the bank angle changes over time.

In particular, the first tire force estimating section 11 estimates the vertical force and the lateral force which are applied from the ground surface to the wheel, according to the first motion equation (equation (4)), the second motion equation (equation (5)), and the third equation (equation (6)). The first motion equation (equation (4)) is the equation representing a relation of the balance between the change over time of the motion state of the vehicle body in the vertical direction and the vertical force. The second motion equation (equation (5)) is the equation representing a relation of the balance between the change over time of the motion state of the vehicle body in the lateral direction and the lateral force. The third motion equation (equation (6)) is the equation representing a relation of the balance between the change over time of the motion state of the vehicle body around the forward-rearward axis, and the vertical force and the lateral force. By use of the three motion equations, the first tire force estimating section 11 can estimate the vertical force and the lateral force which are two unknown values.

In particular, the first tire force estimating section 11 obtains the change over time of the motion state in the vertical direction, the change over time of the motion state in the lateral direction, and the change over time of the motion state around the forward-rearward axis, based on the value (specifically, the bank angular velocity $\beta$ •, the bank angular acceleration rate $\beta$••) associated with the change over time of the bank angle $\beta$ of the vehicle body. In other words, the first motion equation (equation (4)), the second motion equation (equation (5)), and the third equation (equation (6)) have the values associated with the change over time of the bank angle $\beta$ of the vehicle body, as factors. If the bank angle $\beta$ or the value associated with the change over time of the bank angle $\beta$ is obtained, then other required values can be easily obtained by differentiation (or integration). Therefore, by merely obtaining one input information, the first tire force estimating section 11 can estimate the vertical force and the lateral force which are the two unknown values.

The tire force estimating device 1 is mounted in the vehicle including the front wheel and the rear wheel as the wheels. In that case, the first tire force estimating section 11 estimates the front wheel force and the rear wheel force by estimating the sum of the force applied from the ground surface to the front wheel and the force applied from the ground surface to the rear wheel based on the change over time of the motion state of the vehicle body within the plane perpendicular to the forward-rearward axis (virtual axis line extending in the forward and rearward direction and passing through the ground point of the front wheel and the ground point of the rear wheel), and by dividing the sum force into the front wheel force applied from the ground surface to the front wheel and the rear wheel force applied from the ground surface to the rear wheel. In this method, the sum of the forces acting on the whole of the wheel is firstly estimated, and then the sum force is divided into the front wheel force and the rear wheel force. Compared to a case where the sum force is estimated by independently estimating the front wheel force and the rear wheel force and by adding the front wheel force and the rear wheel force, estimation calculation load can be reduced, and reduction of estimation accuracy can be suppressed.

The first tire force estimating section 11 divides the sum force into the front wheel force and the rear wheel force based on the change over time of the motion state of the vehicle body in the forward and rearward direction. Since the change over time of the motion state of the vehicle body in the forward and rearward direction is equivalent to a product of the inertia mass and the forward-rearward acceleration rate, the dividing ratio of the sum force into the front wheel force and the rear wheel force is changed depending on the forward-rearward acceleration rate. Even in the transit state in which the vehicle is accelerated or decelerated, the sum force is divided by taking the forward-rearward acceleration rate into account. This makes it possible to improve the accuracy of estimating the front wheel force and the rear wheel force. In particular, at the beginning of the turning, the bank angle is increased while the vehicle is decelerated. At the end of the turning, the bank angle is reduced while the vehicle is accelerated. In the present example, since both of the bank angle and the forward-rearward acceleration rate are taken into account, the tire force at the beginning of the turning and the tire force at the end of the turning can be estimated with high accuracy.

The estimating method used in this tire force estimating device 1 includes (1) step of obtaining the vehicle body information, (2) step of obtaining the traveling information, (3) step of estimating the sum force, and (4) step of dividing the sum force into the front wheel force and the rear wheel force. In the step (1), the parameters which are required for the calculation and other than the traveling state, such as the wheel base, the position of the center of mass, and the vehicle body mass, are obtained. These parameters are obtained from the sensors located outside the device, from the storage section inside the device, or as the intermediate values by the processor within the device. For example, the vehicle body mass may be pre-stored in the storage section as a constant, or may be estimated by the processor based on the input values from a weight sensor and other sensors. In the step (2), the parameters indicating the traveling state are obtained. The parameters are obtained as the input values from the sensors (in the above example, the sensors 2 to 4) located outside the device or as the intermediate values (in the above example, the bank angular velocity β • or the like) by the processor 1b within the device. In the step (3), the sum of the forces (sum vertical force, sum lateral force, and the sum forward-rearward force) is estimated based on the information obtained in the step (1) and the step (2). In the step (4), the front wheel force and the rear wheel force are estimated by dividing the sum force estimated in the step (3) into the front wheel force and the rear wheel force, by taking the information obtained in the step (1) and/or the step (2) into account. The order of the step (1) and the step (2) may be changed as desired.

In accordance with the estimating method used in the first tire force estimating section 11, the vertical force and the lateral force are estimated based on the angle (the bank angle β) of the vehicle body around the forward-rearward axis, the angular velocity (the bank angular velocity β •), and the angular acceleration rate (the bank angular acceleration rate β ••). In the plane perpendicular to the forward-rearward axis, a trigonometric function is applied to the angle of the vehicle body around the forward-rearward axis and the value associated with the change over time of the angle of the vehicle body around the forward-rearward axis. By doing so, it becomes possible to obtain the acceleration rate of a vertical component and the acceleration rate of a lateral component, which occur while the vehicle body is tilted or rotated around the forward-rearward axis. By obtaining the acceleration rates, it becomes possible to easily estimate the vertical force as the external force acting on the vehicle body in the vertical direction and the lateral force as the external force acting on the vehicle body in the lateral direction, by using the inertia mass as a proportionality coefficient.

In accordance with the estimating method used in the first tire force estimating section 11, the virtual wheel which is a representative or integration of the front wheel and the rear wheel is assumed. Firstly, the sum of the forces applied from the ground surface to the virtual wheel is estimated. Then, the sum of the forces is divided into the front wheel force and the rear wheel force based on the bank angle and the forward-rearward acceleration rate. The forces applied from the ground surface to the wheel are estimated by taking the crown diameter into account. Therefore, accuracy of estimation can be further improved.

The tire forces estimated in the above-described manner can be utilized for various purposes such as a vehicle control and vehicle development/design assist.

Thus far, the embodiment of the present invention has been developed. The above-described embodiment can be changed, added or deleted within the scope of the invention.

The tire force estimating device may be realized by a controller for an engine control which is mounted in the vehicle body. For example, the tire force estimating device may be realized by, for example, a controller for braking used in ABS (anti-lock braking system), or a controller used in a meter display control. Thus, the tire force estimating device may be realized by a device which is capable of calculations which is mounted in the vehicle.

The equations are exemplary and may be different by taking other influences into account. Although in the above-described example, the gravitational force is considered as the external force which affects the estimation of the tire forces, another external force may be considered. In that case, an external force term set by taking the influences of the external force into account is added to the equation or a compensation coefficient which makes the value of the tire force close to an actual measurement result may be added to the equation. As another external force, an air resistance generated during traveling, a force generated due to a trail wind to move the vehicle body in a moving direction, may be considered. The sum of the external force and the tire force emerges as the change over time of the motion state of the vehicle body.

Regarding obtaining the change over time of the bank angle, information having a correlation with the change over time of the bank angle used in the calculations, the correlation allowing estimation of known information or a trend of the change over time of the bank angle, under the transit state, may be used as the bank angle related information, instead of the change over time of the bank angle. For example, instead of the bank angle obtained over time as described above, the bank angular velocity or a change over time of a distance from the center of mass of the vehicle body to the ground surface, may be used.

The same applies to obtaining the acceleration rate of the vehicle body. Other information may be used so long as the acceleration rate of the vehicle body can be estimated based on the information. For example, wheel speed information of the front wheel or rotation information of a rotary shaft (camshaft for engine valve operation, drive wheel axle, etc.) rotated by the driving power source.

Although in the above-described example, the rear wheel forward-rearward force is estimated, based on the sum forward-rearward force and the front wheel forward-rearward force, another method may be used to estimate the rear wheel forward-rearward force. For example, driving power may be derived from a detection value such as an engine speed with reference to a predetermined performance curve (torque map), or a rear wheel braking force may be derived from a map relating to the rear wheel brake pressure and the braking force utilizing the inertia. In this way, the rear wheel forward-rearward force may be estimated without use of the sum forward-rearward force and the front wheel forward-rearward force.

The equation (10) and the equation (11) are merely exemplary. Other values may be used. For example, in a case where the crown diameter affects less, the equations (formulas) may be set without taking the crown diameter into account. The equations may be set by taking the external forces other than the tire forces into account. For example, the equations may be set by taking the influences of lateral wind into account. The equations may be expressed by a Laplace function or a determinant. Further, without using the equations, a map in which a roll angle, a roll angular velocity, and a roll angular acceleration rate are variables may be pre-stored, and the tire forces within the plane perpendicular to the forward-rearward axis may be estimated with reference to this map. Regarding the roll angle, the roll angular velocity, and the roll angular acceleration rate, in a case where one of them affects less, one of them may be omitted. By estimating the tire forces based on at least one of the roll angular velocity and the roll angular acceleration rate, without using the above equations, a trend of the change in the tire forces in the transit state can be easily estimated.

The equation (14) and the equation (16) can be derived theoretically based on geometric information. The equations (formulas) may be set approximately based on measurement values obtained by an experiment. Without using the equations, a map in which the forward-rearward acceleration rate and the bank angle are variables may be pre-stored, and the front and rear wheel tire forces may be derived with reference to this map. In a case where the above-described sum tire force is divided into the front and rear wheel tire forces, the detected values can be made small. However, a sum tire force derived obtained by use of another estimating method may be divided into the front and rear wheel tire forces by use of the equation (14), the equation (16), or an equation or a map having a similar trend.

The present invention can be suitably used in the estimation of tire forces of a vehicle other than the motorcycle, which can turn in a bank state. For example, the tire forces of a vehicle including a plurality of front or rear wheels, for example, a three-wheeled vehicle including two front wheels can be estimated. Further, the present invention is applicable to the estimation of the tire forces of a bicycle or monocycle to which a rider gives a driving force.

Although the vertical force, the lateral force, and the forward-rearward force are estimated, the present invention includes a case where one of them is estimated. For example, the present invention includes a case where the vertical force and the lateral force are derived based on the change over time of the bank angle without deriving the forward-rearward force. The present invention also includes a case where only one of the vertical force and the lateral force is derived. The present invention also includes a case where one of the sum vertical force and the sum lateral force is estimated without dividing the sum force into the front wheel force and the rear wheel force. Further, the present invention includes a case where the sum vertical force and the sum lateral force are estimated by, for example, an experiment instead of the above method, and the sum force is divided into the front and rear wheel forces based on the acceleration rate and the bank angle of the vehicle body.

Although the tire force estimating device 1 is mounted in the vehicle, it may be disposed outside the vehicle. For example, information unique to the vehicle, such as the position of center of mass, may be obtained or stored, information corresponding to the vehicle speed, information corresponding to the change in the bank angle, and information corresponding to the front wheel brake pressure may be obtained from the vehicle during or after the traveling, and the tire forces of the vehicle being traveling may be estimated. For example, the tire force estimating device may be a dedicated processor unit different from an in-vehicle ECU. For example, the tire force estimating device may be a processor unit disposed outside the vehicle and including a communication section which can receive vehicle information transmitted from the vehicle body.

Although in the above-described example, the estimated tire forces are used in the vehicle control, the present invention is not limited to this. The purpose of the use of the tire forces estimated in the present invention is not limited, and may be other than the vehicle control.

The present invention includes manual estimation. The tire forces need not be estimated automatically by the calculation performed by the processor unit.

REFERENCE CHARACTERS LIST 1 tire force estimating device
11 first tire force estimating section
12 second tire force estimating section

The invention claimed is:

1. A tire force estimating device which estimates tire forces which are forces applied from a ground surface to a wheel of a vehicle which turns in a bank state in which a vehicle body is tilted around a forward-rearward axis, the tire force estimating device comprising:
   a bank angle sensor configured to measure a bank angle; and
   a processor configured to:
      implement a first tire force estimating section which:
         computes a time derivative of the bank angle;
         estimates an acceleration rate of a center of mass of the vehicle body in a vertical direction within a plane perpendicular to the forward-rearward axis as a product of the time derivative of the bank angle and a height of the center of mass; and
         estimates a vertical force applied in the vertical direction from the ground surface to the wheel from parameters including the acceleration rate of the center of mass of the vehicle body in the vertical direction within the plane perpendicular to the forward-rearward axis, gravitational acceleration rate, and a vehicle mass; and
      perform a vehicle control operation or a vehicle design operation based at least in part on the vertical force.

2. The tire force estimating device according to claim 1, wherein the first tire force estimating section estimates the vertical force and a lateral force which are applied from the ground surface to the wheel by use of a first motion equation, a second motion equation, and a third motion equation,
   wherein the first motion equation indicates a relation of a balance between the acceleration rate of the center of mass of the vehicle body in the vertical direction, and the vertical force,
   wherein the second motion equation indicates a relation of a balance between an acceleration rate of the center of mass of the vehicle body in a lateral direction, and the lateral force, and
   wherein the third motion equation indicates a relation of a balance between an angular acceleration rate of the center of mass of the vehicle body around the forward-rearward axis, and the vertical force and the lateral force.

3. The tire force estimating device according to claim 2, wherein the first tire force estimating section obtains the acceleration rate of the center of mass of the vehicle body in the vertical direction, the acceleration rate of the center of mass of the vehicle body in the lateral direction, and the angular acceleration rate of the center of mass of the vehicle body around the forward-rearward axis, based on a value associated with the time derivative of the bank angle of the vehicle body.

4. The tire force estimating device according to claim 1, wherein the wheel is a front wheel,
wherein the vehicle further includes a rear wheel, and
wherein the first tire force estimating section estimates a sum of the force applied from the ground surface to the front wheel and the force applied from the ground surface to the rear wheel, based on the acceleration rate of the center of mass of the vehicle body within the plane perpendicular to the forward-rearward axis, and estimates a front wheel force applied from the ground surface to the front wheel and a rear wheel force applied from the ground surface to the rear wheel by dividing the sum of the forces into the front wheel force and the rear wheel force.

5. The tire force estimating device according to claim 4, wherein the first tire force estimating section divides the sum of the forces into the front wheel force and the rear wheel force, based on an acceleration rate of the center of mass of the vehicle body in a forward and rearward direction.

6. The tire force estimating device according to claim 5, wherein the first tire force estimating section changes a ratio of dividing the sum of the forces into the front wheel force and the rear wheel force, based on the bank angle.

7. The tire force estimating device according to claim 1, wherein the processor is further configured to implement:
a second tire force estimating section which estimates forward-rearward forces applied from the ground surface to the wheel in a forward and rearward direction,
wherein the second tire force estimating section estimates a sum of the forward-rearward force applied from the ground surface to a front wheel and the forward-rearward force applied from the ground surface to a rear wheel, based on an acceleration rate of the center of mass of the vehicle body in the forward and rearward direction,
wherein the second tire force estimating section estimates a front wheel forward-rearward force applied from the ground surface to the front wheel, based on a braking force of the front wheel, and
wherein the second tire force estimating section estimates a rear wheel forward-rearward force applied from the ground surface to the rear wheel based on the estimated sum of the forward-rearward forces, and the estimated front wheel forward-rearward force.

8. The tire force estimating device according to claim 1, wherein the first tire force estimating section estimates the acceleration rate of the center of mass of the vehicle body in the vertical direction within the plane perpendicular to the forward-rearward axis based on a formula:

$$\ddot{z}_G = -h_0(\ddot{\beta} \sin \beta + \dot{\beta}^2 \cos \beta),$$

wherein
$\ddot{z}_G$ represents the acceleration rate of the center of mass of the vehicle body in the vertical direction within the plane perpendicular to the forward-rearward axis,
$\beta$ represents the bank angle,
$\dot{\beta}$ represents a first-order temporal differentiation value of the bank angle $\beta$,
$\ddot{\beta}$ represents a second-order temporal differentiation value of the bank angle $\beta$, and
$h_0$ represents the height of the center of mass.

9. A tire force estimating device which estimates tire forces which are forces applied from a ground surface to a front wheel and a rear wheel of a vehicle which turns in a bank state in which a vehicle body is tilted around a forward-rearward axis, the tire force estimating device comprising:
a bank angle sensor configured to measure a bank angle; and
a processor configured to:
implement a first tire force estimating section which:
computes a time derivative of the bank angle;
estimates an acceleration rate of a center of mass of the vehicle body in a vertical direction within a plane perpendicular to the forward-rearward axis as a product of the time derivative of the bank angle and a height of the center of mass;
estimates a sum of the forces applied from the ground surface to a virtual wheel from parameters including the acceleration rate of the center of mass of the vehicle body in the vertical direction within the plane perpendicular to the forward-rearward axis, gravitational acceleration rate, and a vehicle mass; and
estimates a front wheel force applied from the ground surface to the front wheel and a rear wheel force applied from the ground surface to the rear wheel by dividing the sum of the forces into the front wheel force and the rear wheel force from parameters including an acceleration rate of the center of mass of the vehicle body in a forward and rearward direction, the bank angle, a distance in the forward and rearward direction from an axle of the rear wheel to an axle of the front wheel, and a distance in the forward and rearward direction from the axle of the rear wheel to the center of mass; and
perform a vehicle control operation or a vehicle design operation based at least in part on the front wheel force and the rear wheel force.

10. A method of estimating tire forces which are forces applied from a ground surface to a wheel of a vehicle which turns in a bank state in which a vehicle body is tilted around a forward-rearward axis, the method comprising:
measuring a bank angle at a bank angle sensor;
based on the bank angle, estimating an angular velocity and an angular acceleration rate of the vehicle body around the forward-rearward axis;
estimating an acceleration rate of a center of mass of the vehicle body in a vertical direction within a plane perpendicular to the forward-rearward axis as a product of a time derivative of the bank angle and a height of the center of mass;
estimating a vertical force applied in the vertical direction from the ground surface to the wheel from parameters including the acceleration rate of the center of mass of the vehicle body in the vertical direction within the plane perpendicular to the forward-rearward axis, gravitational acceleration rate, and a vehicle mass; and performing a vehicle control operation or a vehicle design operation based at least in part on the vertical force.

11. The method of estimating tire forces according to claim 10, wherein the wheel is a front wheel, wherein the vehicle further includes a rear wheel, the method comprising:

estimating a sum of the forces applied from the ground surface to a virtual wheel; and dividing the sum of the forces into a front wheel force applied to the front wheel and a rear wheel force applied to the rear wheel, based on an acceleration rate of a center of mass of the vehicle body in a forward and rearward direction, and the bank angle.

* * * * *